US010054999B2

(12) United States Patent
Tal et al.

(10) Patent No.: US 10,054,999 B2
(45) Date of Patent: *Aug. 21, 2018

(54) PROCESSOR CLOCKING POLICIES FOR MOBILE COMPUTING DEVICES

(71) Applicant: Facebook, Inc., Menlo Park, CA (US)

(72) Inventors: Eran Tal, San Jose, CA (US); Benoit M. Schillings, Los Altos, CA (US); Michael John McKenzie Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 15/470,454

(22) Filed: Mar. 27, 2017

(65) Prior Publication Data

US 2017/0199557 A1    Jul. 13, 2017

Related U.S. Application Data

(63) Continuation of application No. 13/648,900, filed on Oct. 10, 2012, now Pat. No. 9,618,994.

(51) Int. Cl.
*G06F 1/32* (2006.01)
*G06F 9/50* (2006.01)
*H04W 52/02* (2009.01)

(52) U.S. Cl.
CPC ............... *G06F 1/324* (2013.01); *G06F 1/32* (2013.01); *G06F 1/3206* (2013.01); *G06F 1/329* (2013.01); *G06F 9/5094* (2013.01); *H05K 999/99* (2013.01); *G06F 1/325* (2013.01); *G06F 1/3209* (2013.01); *G06F 1/3296* (2013.01); *H04W 52/0258* (2013.01); *Y02D 10/126* (2018.01); *Y02D 10/22* (2018.01); *Y02D 10/24* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/22* (2018.01); *Y02D 70/26* (2018.01)

(58) Field of Classification Search
CPC ........................................................ G06F 1/28
USPC ........ 713/300, 310, 320, 322, 323, 324, 375
See application file for complete search history.

(56) References Cited

U.S. PATENT DOCUMENTS

| 8,370,663 B2* | 2/2013 | Frid ................... G06F 1/3203 713/323 |
| 8,694,811 B2* | 4/2014 | Raju ................... G06F 1/3203 713/320 |
| 2002/0178387 A1* | 11/2002 | Theron ................. G06F 1/32 713/300 |

(Continued)

*Primary Examiner* — Jaweed A Abbaszadeh
*Assistant Examiner* — Keshab Pandey
(74) *Attorney, Agent, or Firm* — Baker Botts L.L.P.

(57) ABSTRACT

In one embodiment, a method includes a server receiving activity data from a plurality of computing devices, wherein the activity data is associated with running a particular application; identifying, based on the activity data, a pattern of execution related to executing one or more sequences of instructions associated with running the particular application; determining, based on the pattern of execution, a clocking policy for running the particular application, wherein the clocking policy is configured to modify a clock speed of one or more processors of a particular computing device while running the particular application; and sending the clocking policy to the particular computing device.

20 Claims, 6 Drawing Sheets

(56) References Cited

U.S. PATENT DOCUMENTS

2007/0240006 A1* 10/2007 Fung .................. G06F 1/32
                                                713/323
2012/0023226 A1*  1/2012 Petersen .............. H04W 4/18
                                                709/224

* cited by examiner

PROCESSOR CLOCKING POLICIES FOR MOBILE COMPUTING DEVICES

PRIORITY

This application is a continuation under 35 U.S.C. § 120 of U.S. patent application Ser. No. 13/648,900, filed 10 Oct. 2012.

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touch screens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a processor of a computing device (e.g. a mobile computing device) may execute a sequence of instructions that depends on one or more external operations. The external operation may be, for example, a fetching of data for use by the sequence of instructions. In particular embodiments, software of the computing device may determine a clocking policy for the processor during execution of the sequence of instructions. The software may, for example, be a kernel of an operating system running on the computing device. The clocking policy may be based on a pattern of execution involving the sequence of instructions and the external operations (e.g. a pattern in which the sequence of instructions is active and then idle while waiting for the external operations to complete). The clocking policy may modify a clock speed of the processor (e.g. overclocking or underclocking the processor). The software of the computing device may apply the clocking policy to the processor during execution of at least a portion of the sequence of instructions.

DESCRIPTION OF EXAMPLE EMBODIMENTS

Figure 1:
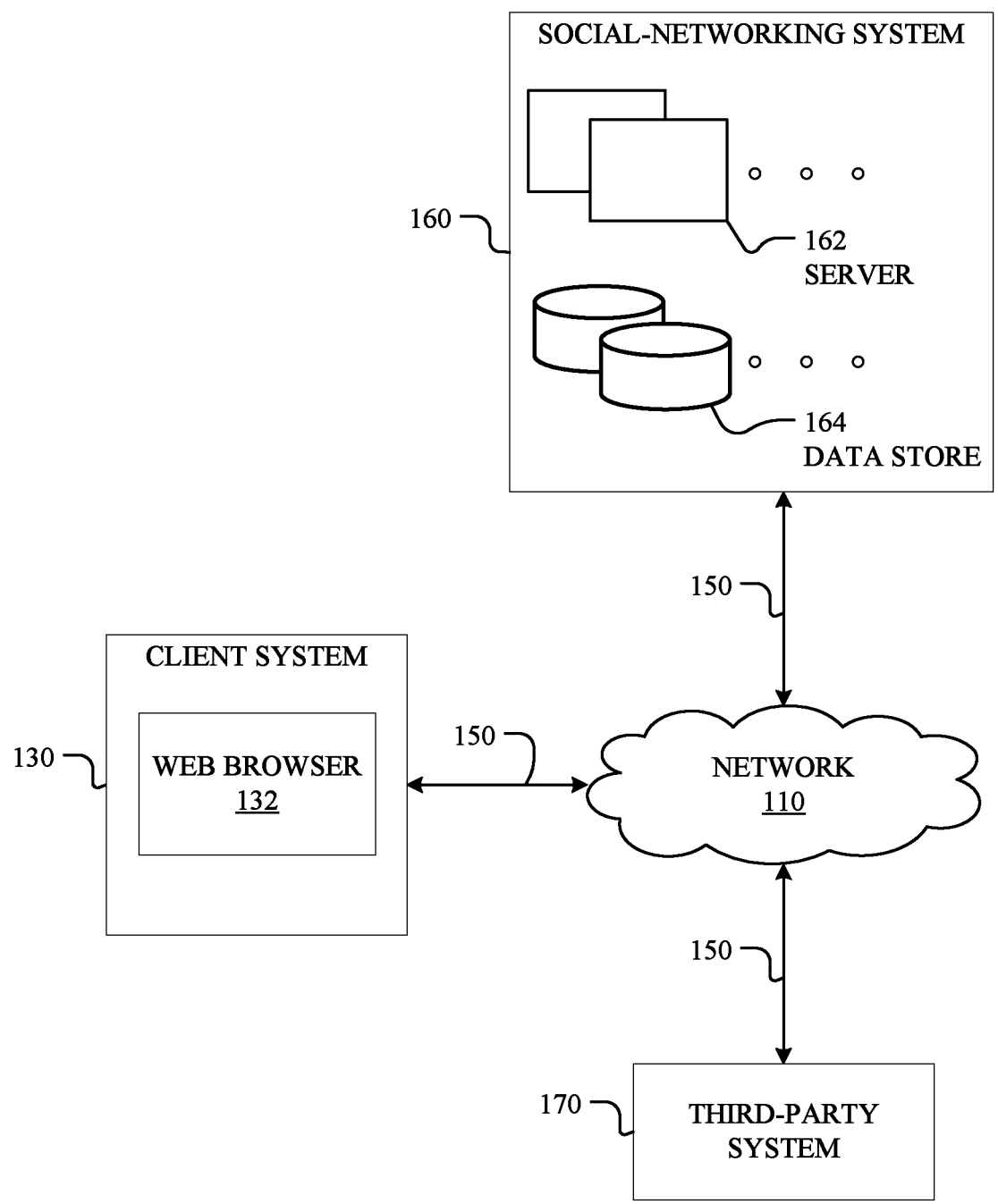
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g. that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client device 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client device 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client devices 130 or one or more third-party system 170 via network 110. The web server may include a mail server or other messaging functionality for receiving and routing messages between social-networking system 160 and one or more client devices 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client device 130. Information may be pushed to a client device 130 as notifications, or information may be pulled from client device 130 responsive to a request received from client device 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client devices 130 associated with users. Ad-pricing modules may combine social information, the current time, location information, or other suitable information to provide relevant advertisements, in the form of notifications, to a user.

Figure 2:
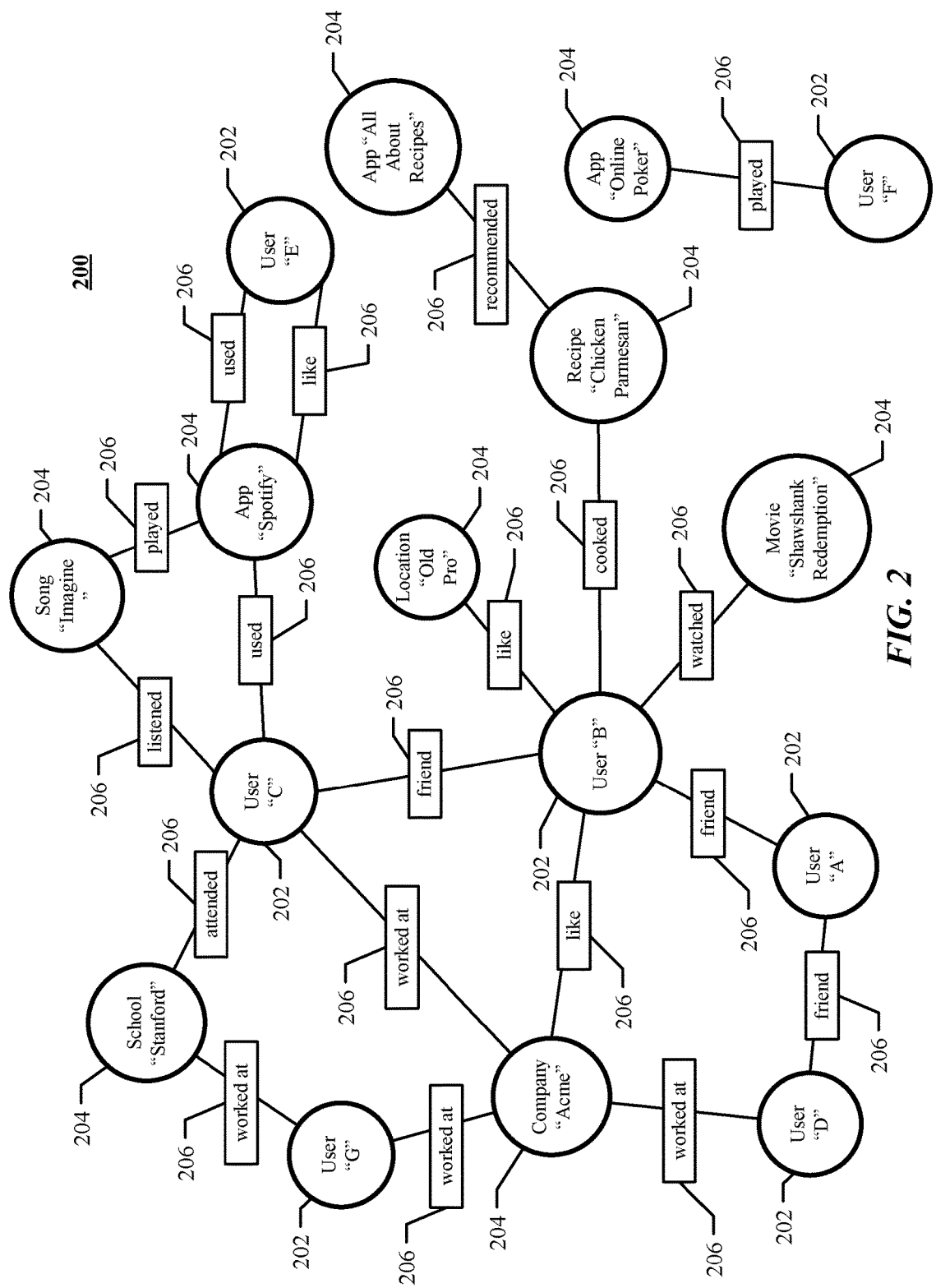
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages or one or more user-profile pages (which may be webpages).

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to a webpage.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
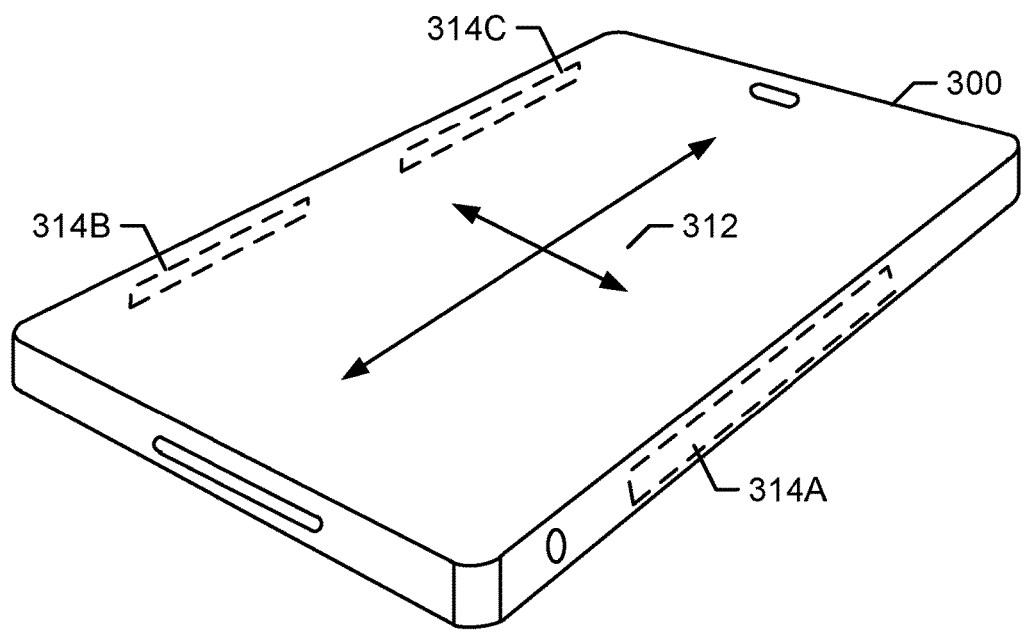
FIG. 3 illustrates an example client system.

FIG. 3 illustrates an example client system 130, a mobile device, which may communicate with a social-networking system 160 via a network 110. This disclosure contemplates mobile device 300 taking any suitable physical form. As example and not by way of limitation, mobile device 300 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile device 300 may have a touch screen 312 as an input component. In the example of FIG. 3, touch screen 312 is incorporated on a front surface of mobile device 300. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 314A-C may be incorporated into one or more sides of mobile device 300. Antennae 314A-C are components that convert electric current into radio waves, and vice versa. During transmission of signals, a transmitter applies an oscillating radio frequency (RF) electric current to terminals of antennae 314A-C, and antennae 314A-C radiate the energy of the applied current as electromagnetic (EM) waves. During reception of signals, antennae 314A-C convert the power of an incoming EM wave into a voltage at the terminals of antennae 314A-C. The voltage may be transmitted to a receiver for amplification.

Figure 4:
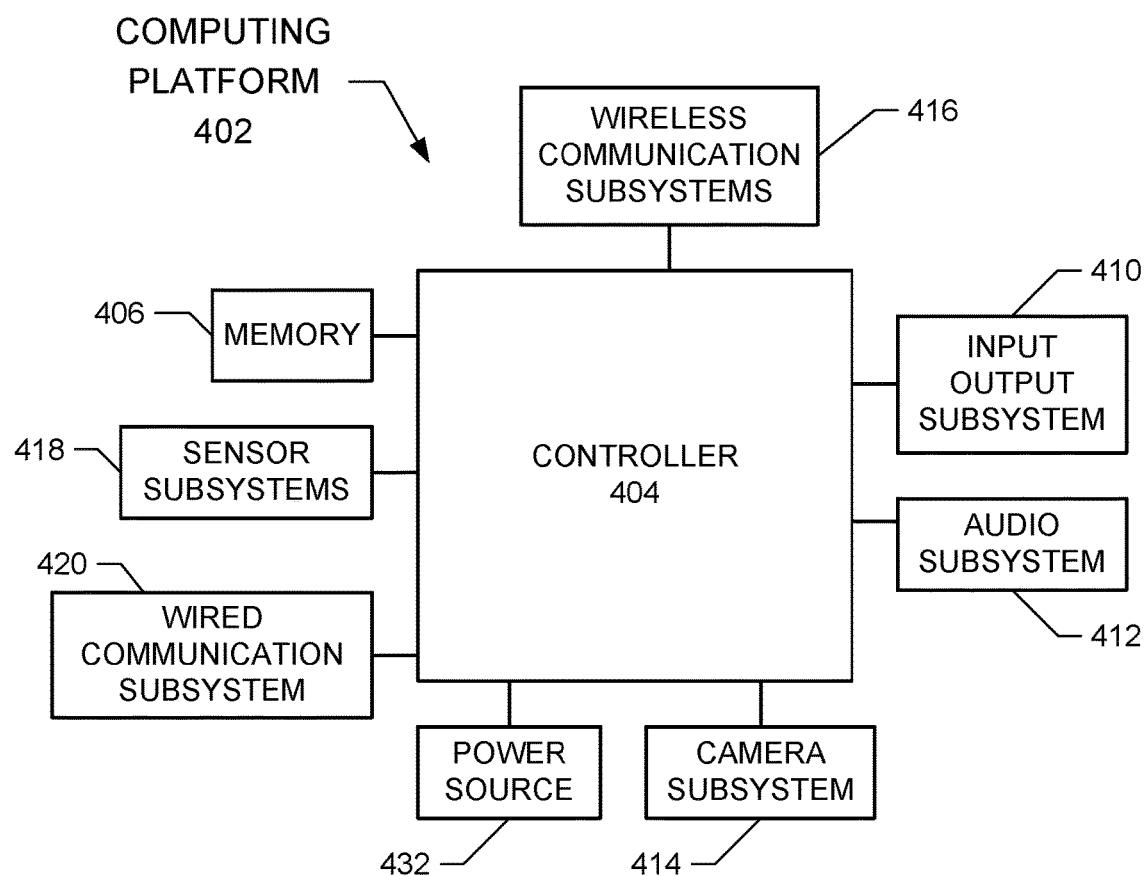
FIG. 4 illustrates an example computing platform of a mobile device.

While the mobile device 300 may be implemented in a variety of different hardware and computing systems, FIG. 4 shows a schematic representation of the main components of an example computing platform of a mobile device, according to various particular embodiments. In particular embodiments, computing platform 402 may comprise controller 404, memory 406, and input output subsystem 410. In particular embodiments, controller 404 which may comprise one or more processors and/or one or more microcontrollers configured to execute instructions and to carry out operations associated with a computing platform. In various embodiments, controller 404 may be implemented as a single-chip, multiple chips and/or other electrical components including one or more integrated circuits and printed circuit boards. Controller 404 may optionally contain a cache memory unit for temporary local storage of instructions, data, or computer addresses. By way of example, using instructions retrieved from memory, controller 404 may control the reception and manipulation of input and output data between components of computing platform 402. By way of example, controller 404 may include one or more processors or one or more controllers dedicated for certain processing tasks of computing platform 402, for example, for 2D/3D graphics processing, image processing, or video processing.

Controller 404 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 406 that is operatively coupled to controller 404.

Memory 406 may encompass one or more storage media and generally provide a place to store computer code (e.g. software and/or firmware) and data that are used by computing platform 402. By way of example, memory 406 may include various tangible computer-readable storage media including Read-Only Memory (ROM) and/or Random-Access Memory (RAM). As is well known in the art, ROM acts to transfer data and instructions uni-directionally to controller 404, and RAM is used typically to transfer data and instructions in a bi-directional manner. Memory 406 may also include one or more fixed storage devices in the form of, by way of example, hard disk drives (HDDs), solid-state drives (SSDs), flash-memory cards (e.g. Secured Digital or SD cards), among other suitable forms of memory coupled bi-directionally to controller 404. Information may also reside on one or more removable storage media loaded into or installed in computing platform 402 when needed. By way of example, any of a number of suitable memory cards (e.g. SD cards) may be loaded into computing platform 402 on a temporary or permanent basis.

Input output subsystem 410 may comprise one or more input and output devices operably connected to controller 404. For example, input output subsystem may include keyboard, mouse, one or more buttons, and/or, display (e.g. liquid crystal display (LCD), or any other suitable display technology). Generally, input devices are configured to transfer data, commands and responses from the outside world into computing platform 402. The display is generally configured to display a graphical user interface (GUI) that provides an easy to use visual interface between a user of the computing platform 402 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 410 may also include touch based devices such as touch pad and touch screen. A touchpad is an input device including a surface that detects touch-based inputs of users. Similarly, a touch screen is a display that detects the presence and location of user touch inputs. Input output system 410 may also include dual touch or multi-touch displays or touch pads that can identify the presence, location and movement of more than one touch inputs, such as two or three finger touches.

In particular embodiments, computing platform 402 may additionally comprise audio subsystem 412, camera subsystem 412, wireless communication subsystem 416, sensor subsystems 418, and/or wired communication subsystem 420, operably connected to controller 404 to facilitate various functions of computing platform 402. For example, Audio subsystem 412, including a speaker, a microphone, and a codec module configured to process audio signals, can be utilized to facilitate voice-enabled functions, such as voice recognition, voice replication, digital recording, and telephony functions. For example, camera subsystem 412, including an optical sensor (e.g. a charged coupled device (CCD), image sensor), can be utilized to facilitate camera functions, such as recording photographs and video clips. For example, wired communication subsystem 420 can include a Universal Serial Bus (USB) port for file transferring, or a Ethernet port for connection to a local area network (LAN). Additionally, computing platform 402 may be powered by power source 432.

Wireless communication subsystem 416 can be designed to operate over one or more wireless networks, for example, a wireless PAN (WPAN) (e.g. a BLUETOOTH), a WI-FI network (e.g. an 802.11a/b/g/n network), a WI-MAX network, a cellular network (such as, for example, a Global System for Mobile Communications (GSM) network, a Long Term Evolution (LTE) network). Additionally, wireless communication subsystem 416 may include hosting protocols such that computing platform 402 may be configured as a base station for other wireless devices. Other input/output devices may include an accelerometer that can be used to detect the orientation of the device.

Sensor subsystem 418 may include one or more sensor devices to provide additional input and facilitate multiple functionalities of computing platform 402. For example, sensor subsystems 418 may include GPS sensor for location positioning, altimeter for altitude positioning, motion sensor for determining orientation of a mobile device, light sensor for photographing function with camera subsystem 414, temperature sensor for measuring ambient temperature, and/or biometric sensor for security application (e.g. fingerprint reader).

In particular embodiments, various components of computing platform 402 may be operably connected together by one or more buses (including hardware and/or software). As an example and not by way of limitation, the one or more buses may include an Accelerated Graphics Port (AGP) or other graphics bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these.

The mobile device 300 may execute one or more software applications (e.g. running on an operating system of computing platform 402). The execution of these applications may cause one or more processors (e.g. of controller 404) to enter an active processing state. For example, executing an application for displaying video content (e.g. a movie) may cause one or more processors to enter an active state in order to process (e.g. decode) the video content to be displayed on a screen (e.g. touch screen 312) at the next screen refresh. The execution of these applications may also cause one or more processors to enter an idle (or "sleep") state. For example, executing an application for displaying video content may cause one or more processors to enter an idle state while waiting for the delivery of the next batch (e.g. frame) of video content to be processed and then displayed. The delivery of the next batch of video content may be the result of one or more external operations. For a given processor, an external operation may be an operation that occurs off the processor, separate from the processor, or otherwise external to the processor. The external operation may, for example, provide an input (e.g. a signal) to the processor. The execution of a software application may cause one or more sequences of instructions (e.g. processes or threads) associated with the application to execute. For example, executing an application for displaying video content may cause one or more sequences of instructions to start executing (causing one or more processors to enter an active state) and later stop executing (causing one or more processors to enter an idle state). Such patterns of activity of sequences of instructions may cause a processor to alternately enter active and idle states within a given time period. In particular embodiments, by analyzing such patterns, a processor-level clocking policy may be developed to adjust the clocking speed or period based on the activity level (including inactivity) of the processor. This may improve power usage by the processor, as the power used by a processor is related to the square of the clock speed. Additionally, the voltage required by the processor may be reduced when the clocking speed of the processor is reduced; this reduced voltage requirement may further reduce the power usage by the processor.

As an example, one type of application that may be executed by a client device such as mobile device 300 is a video player for displaying video content. The execution of this type of application requires that video content to be displayed is processed (e.g. decoded or updated) and ready to display at each screen refresh. For example, the screen of mobile device 300 (e.g. touch screen 312) may be refreshed based on a vertical sync signal, Vsync, with a period of, for example, M milliseconds. The period of Vsync may be determined, for example, by a frame rate of the video player application. Thus, in this example, a sequence of instructions of the video player application running on a processor of mobile device 300 would, upon seeing the Vsync trigger, begin processing video content for display at the next screen refresh (i.e. the next Vsync trigger). The sequence of instructions would need to complete processing the video content within the M millisecond timeframe dictated by the period of the Vsync signal so that the content is ready for display at the next screen refresh (i.e. the next Vsync trigger). While the sequence of instructions is actively processing the video content, the processor on which the sequence of instructions is executing may be in an active state.

It may happen in some instances that the sequence of instructions completes processing the video content to be displayed at the next screen refresh in a time less than M milliseconds, i.e. before the next Vsync trigger, and waits for the next batch of video content to be delivered (e.g. by an external operation). During this waiting period, the processor on which the sequence of instructions is executing may be in an idle or sleep state. In particular embodiments, by analyzing the pattern of activity and idle time of the processor (or the pattern of activity of the sequence of instructions), the clocking speed of the processor executing the sequence of instructions may be reduced. Reducing the clocking speed may be done in such a manner as to ensure that the task (e.g. processing of the video content) completes within the M millisecond timeframe while also reducing the idle time of the processor. This may allow for power savings due to the reduced clock speed of the processor. The new, lower processor clock speed may be calculated as follows based on data collected, for example, in a log:

$$\text{Speed}_{new} = \text{Speed}_{old} \times \frac{\text{active time}}{\text{active time} + \text{idle time}} \quad (1)$$

As an example, if the period of the Vsync signal is 5 milliseconds, and if the average time for a sequence of instructions (e.g. of the video player application) to process video content (e.g. processor active time) is 3 milliseconds, then the sequence of instructions will wait for an average of 2 milliseconds for the next Vsync trigger. In this example, the processor executing the sequence of instructions may be idle for those 2 milliseconds of time that the sequence of instructions is waiting. If the original clock speed of the processor is 500 MHz, the clock speed may be reduced as low as 300 MHz (calculated using the formula above), and the task of processing video content for display may still complete in time for the next screen refresh.

It may also happen, however, that the sequence of instructions does not complete processing the video content in a time less than M milliseconds and instead takes some amount of time longer than M milliseconds to process the video content (i.e. after the next Vsync trigger and screen refresh have already occurred). In this example, the clock speed may need to be increased in order to ensure that the task at hand (e.g. processing video content in time for display at the next screen refresh) may be completed. The new, higher processor clock speed may be calculated as follows based on data collected, for example, in a log:

$$\text{Speed}_{new} = \text{Speed}_{old} \times \frac{\text{task period} + \text{overflow}}{\text{task period}} \quad (2)$$

As an example, if the period of the task (e.g. Vsync signal period) is 5 milliseconds, and if the average time for a sequence of instructions (e.g. of the video player application) to complete the task (e.g. process video content) is 7 milliseconds, then the processing time is overflowing into the next task period an average of 2 milliseconds (the "overflow"). If the original clock speed of the processor is 500 MHz, the clock speed may be increased at least to 700 MHz (calculated using the formula above), such that the task of processing video content for display may then complete within one Vsync signal period (e.g. in time for the next screen refresh).

Although particular embodiments illustrating the adjustment of clock speed have been discussed, the adjustment of clock speed (either overclocking or underclocking) may be done for any suitable type of sequence of instructions on a processor, as appropriate. As an example, in the case of a sequential data processing task (e.g. a task depending on a network or disk IO), a processing sequence of instructions may instruct a reader sequence of instructions (e.g. executed by another processor) to read in or fetch data. The processing sequence of instructions may wait or sleep (i.e. the processor executing the processing sequence of instructions may idle) until the reader sequence of instructions returns the first batch of data to the processing sequence of instructions. The processing sequence of instructions may immediately instruct the reader sequence of instructions to read in data again, and while the processing sequence of instructions is waiting for the next batch of data from the reader sequence of instructions, it may process the first batch of data. If the latency of the reader sequence of instructions (e.g. the read time) exceeds the processing time of the data, then it may be desirable to reduce the clock speed of the processor executing the processing sequence of instructions (i.e. underclock the processor). The new speed may be calculated using equation (1) above. In this particular case, the new clock speed would equal the old clock speed multiplied by the processing time of the data (the "active time" of the processor) divided by the read time (which equals the "active time" plus any "idle time" of the processor as the processing sequence of instructions waits for the reader sequence of instructions to return the next batch of data). If, however, the processing time of the data exceeds the latency of the reader sequence of instructions (e.g. the read time), then it may be desirable to increase the clock speed of the processor executing the processing sequence of instructions (i.e. overclock the processor). The new speed may be calculated using equation (2) above.

In particular embodiments, patterns of activity of sequences of instructions may be analyzed to develop a processor-level clocking policy to adjust the clocking speed of a processor. A scheduler or a kernel of an operating system running on a processor of mobile device 300 may see, at an instruction sequence level, different signals indicating the activity over time of various sequences of instructions of the processor, as well as various signals indicating external operations. As an example, the kernel may see the following pattern of instruction sequence execution activity, with each number representing an identifier for a sequence of instructions, over time:

time 1: 10, 2
time 2: 10, 4, 3
time 3: 4, 3
time 4: no sequences of instructions active
time 5: Vsync signal
time 6: 10, 2
time 7: READ signal
time 8: 2
time 9: SLEEP signal
time 10: 10

This activity data of sequences of instructions (e.g. observed by a kernel or scheduler) may be captured over time, for example, in a log at mobile device 300. The log may also be sent to a centralized location such as a server 162 of a social-networking system. The data in the log may be analyzed (e.g. locally by a kernel or scheduler of mobile device 300 or remotely by server 162) to detect patterns related to sequences of instructions starting or stopping (and, therefore, patterns related to processor activity or idle time) at mobile device 300. Patterns related to instruction sequences may be repetitive, which may allow for the patterns to be used to predict or control processor behavior. These patterns may then be used, for example, to create a processor clocking policy so that the processor may be automatically underclocked or overclocked, as appropriate. Additionally, higher-level information (e.g. data from software layers higher than the kernel or scheduler level) including user activity information (e.g. whether a user is touching touch screen 312), application information (e.g. whether a movie is playing on mobile device 300 or what frame rate is required by an application running on mobile device 300) or device information (e.g. whether touch screen 312 is on or off) may also be logged, sent to a centralized location (e.g. server 162), and analyzed in conjunction with activity data of sequences of instructions to detect patterns and create (and refine) processor clocking policies. In particular embodiments, the data may be gathered and then analyzed (e.g. by a kernel or scheduler of mobile device 300 or by server 162) to create a set of categories for machine-learning-based classification in order to create a decision table and processor clocking policy. Any suitable machine-learning technique may be used, including but not limited to: decision trees, expert systems, statistical regressions, probability densities, and probabilistic automata. As an example, the use of machine-learning may lead to a recognition of the pattern that sequences of instructions denoted 4 and 3 wait a certain amount of time (e.g. on average) for the Vsync signal before further instruction sequence activity can take place—i.e. the processor is idle between when sequences of instructions 4 and 3 stop and the Vsync signal is observed. A recognition of this pattern may lead to the creation (e.g. by a kernel or scheduler of mobile device 300 or by server 162) of a policy that automatically underclocks the processor to avoid unnecessary idle time when sequences of instructions 4 and 3 are executed by the processor. This disclosure contemplates the detection of other types of dependencies in the activity data of sequences of instructions or higher-level information. By capturing instruction sequence activity from a user over time (e.g. over hundreds of hours), patterns in usage that may, for example, be dependent on usage context (e.g. a particular application running on mobile device 300) may be detected. Additionally, activity data of sequences of instructions may also be gathered from multiple users (e.g. the users of social-networking system 160), and patterns in usage that depend on usage context or on a particular user may be detected. Data may be gathered from a user or users (e.g. uploaded from each user's mobile device 300 to server 162) on a periodic basis (e.g. every week) in order to capture changes in a user's behavior that may affect the optimal clocking policy.

Once a clocking policy or set of policies are created (e.g. by a kernel or scheduler of mobile device 300 or by server 162), these policies may be placed on mobile device 300 and subsequently applied, for example by a kernel of an operating system running on mobile device 300, to automatically underclock or overclock a processor of mobile device 300 when a pattern specified in the policy or policies is detected. These policies may be flashed onto a memory of the mobile device 300 and run natively on mobile device 300. It is contemplated in this disclosure that a pre-determined and pre-stored (e.g. flashed) policy or set of policies may be used in combination with dynamically-created clocking policies at mobile device 300.

Figure 5:
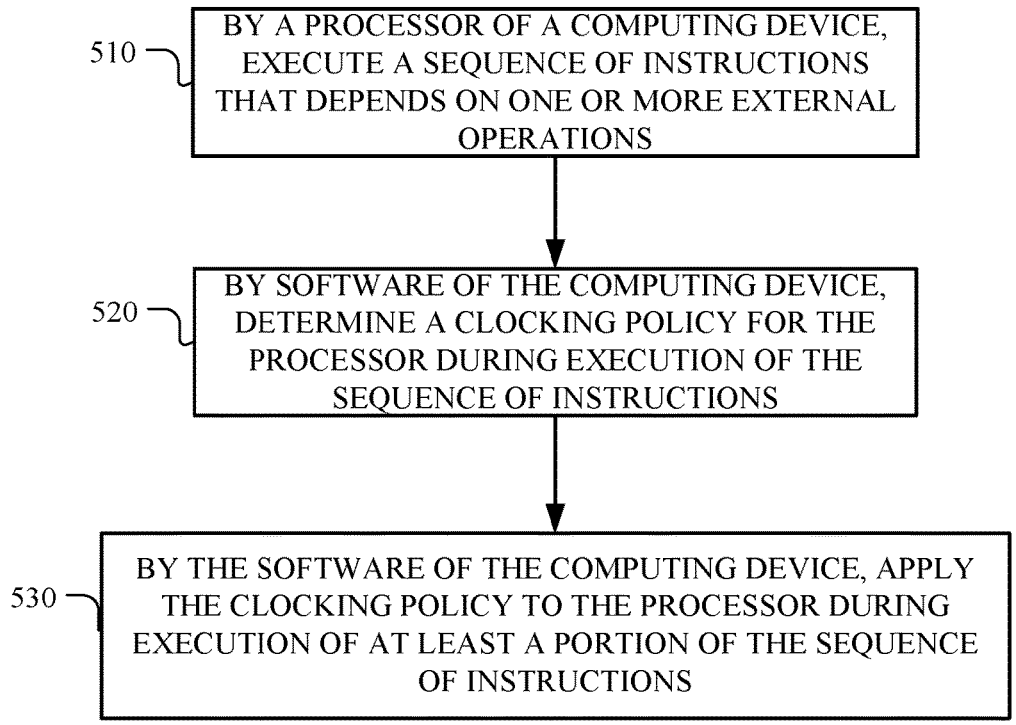
FIG. 5 illustrates an example method implementing a clocking policy at a computing device.

FIG. 5 illustrates an example method for implementing a clocking policy at a computing device (e.g. mobile device 300). At step 510, a processor of the computing device executes a sequence of instructions that depends on one or more external operations. The external operation may be, for example, a fetching of data for use by the sequence of instructions. At step 520, software of the computing device determines a clocking policy for the processor during execution of the sequence of instructions. The software may be a kernel of an operating system running on the computing device. The clocking policy may be based on a pattern of execution involving the sequence of instructions and the external operations (e.g. a pattern in which the sequence of instructions is active and then idle while waiting for the external operations to complete). The clocking policy modifies a clock speed of the processor (e.g. overclocking or underclocking the processor). At step 530, the software of the computing device applies the clocking policy to the processor during execution of at least a portion of the sequence of instructions. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
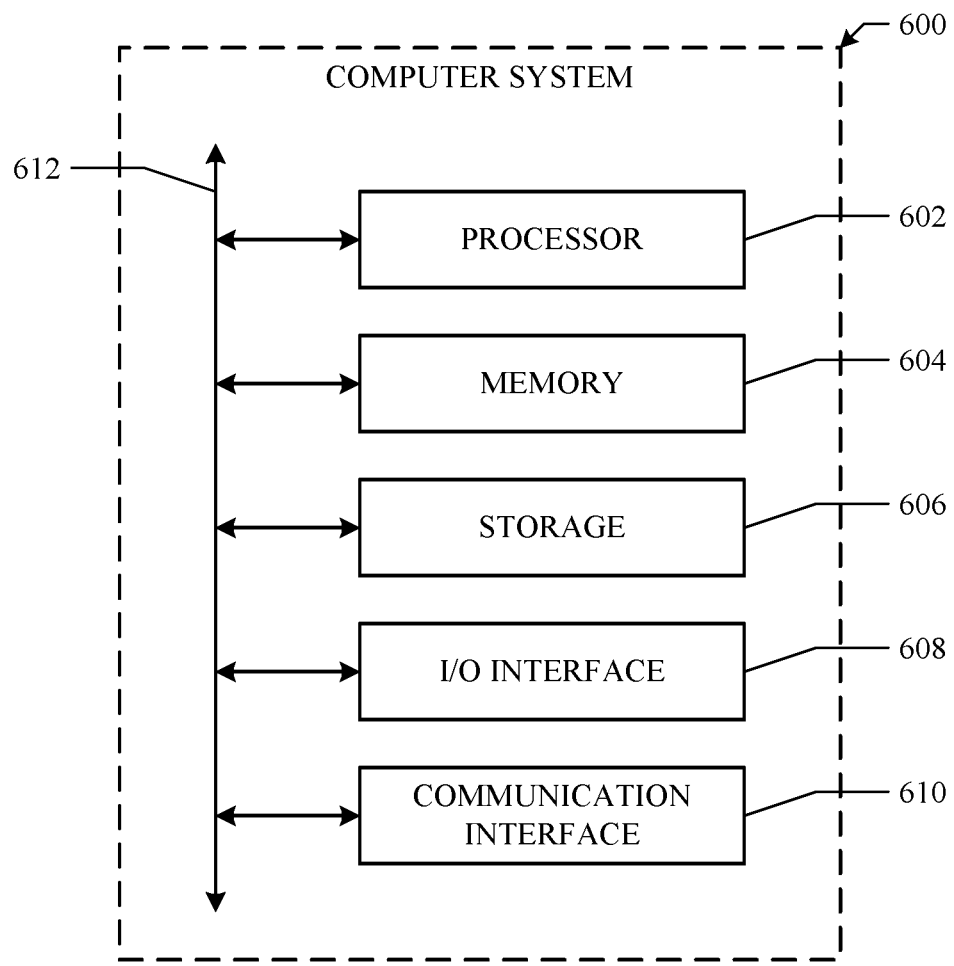
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a server computing machine:
   receiving activity data from a plurality of computing devices, wherein the activity data is associated with running a particular application;
   identifying, based on the activity data, a pattern of execution related to executing one or more sequences of instructions associated with running the particular application;
   determining, based on the pattern of execution, a clocking policy for running the particular application, wherein the clocking policy is configured to modify a clock speed of one or more processors of a particular computing device while running the particular application, wherein the clocking policy is further configured to cause a processor of the particular computing device to execute the sequence of instructions at a reduced clock speed before or during an external operation; and
   sending the clocking policy to the particular computing device.

2. The method of claim 1, further comprising:
   receiving, from one or more of the plurality of computing devices, higher-level information, wherein the higher-level information comprises user activity information, application information, or device information.

3. The method of claim 2, wherein the clocking policy is determined further based on the higher-level information.

4. The method of claim 1, wherein the activity data is stored in one or more data stores associated with the server computing machine.

5. The method of claim 1, wherein the activity data is received from the plurality of computing devices on a periodic basis.

6. The method of claim 1, wherein the plurality of computing devices are associated with a plurality of users of a social-networking system.

7. The method of claim 1, wherein the particular computing device is a mobile computing device.

8. The method of claim 1, wherein the pattern of execution comprises an active period of execution of the sequence of instructions followed by an idle period, the idle period occurring before or during performance of the external operations.

9. A system comprising:
one or more processors; and
one or more computer-readable non-transitory storage media coupled to one or more of the processors and comprising instructions operable when executed by one or more of the processors to cause the system to:
receive activity data from a plurality of computing devices, wherein the activity data is associated with running a particular application;
identify, based on the activity data, a pattern of execution related to executing one or more sequences of instructions associated with running the particular application;
determine, based on the pattern of execution, a clocking policy for running the particular application, wherein the clocking policy is configured to modify a clock speed of one or more processors of a particular computing device while running the particular application, wherein the clocking policy is further configured to cause a processor of the particular computing device to execute the sequence of instructions at a reduced clock speed before or during an external operation; and
send the clocking policy to the particular computing device.

10. The system of claim 9, wherein the instructions are further operable when executed by one or more of the processors to cause the system to:
receive, from one or more of the plurality of computing devices, higher-level information, wherein the higher-level information comprises user activity information, application information, or device information.

11. The system of claim 10, wherein the clocking policy is determined further based on the higher-level information.

12. The system of claim 9, wherein the clocking policy is configured to cause a processor of the particular computing device to execute the sequence of instructions at a reduced clock speed before or during an external operation to reduce idling of the processor during the external operation.

13. The system of claim 9, wherein the pattern of execution comprises an active period of execution of the sequence of instructions followed by an idle period, the idle period occurring before or during performance of the external operations.

14. One or more computer-readable non-transitory storage media comprising software that is operable when executed to:
receive activity data from a plurality of computing devices, wherein the activity data is associated with running a particular application;
identify, based on the activity data, a pattern of execution related to executing one or more sequences of instructions associated with running the particular application;
determine, based on the pattern of execution, a clocking policy for running the particular application, wherein the clocking policy is configured to modify a clock speed of one or more processors of a particular computing device while running the particular application, wherein the clocking policy is further configured to cause a processor of the particular computing device to execute the sequence of instructions at a reduced clock speed before or during an external operation; and
send the clocking policy to the particular computing device.

15. The media of claim 14, wherein the software is further operable when executed to:
receive, from one or more of the plurality of computing devices, higher-level information, wherein the higher-level information comprises user activity information, application information, or device information.

16. The media of claim 15, wherein the clocking policy is determined further based on the higher-level information.

17. The media of claim 14, wherein the plurality of computing devices are associated with a plurality of users of a social-networking system.

18. The media of claim 14, wherein the pattern of execution comprises an active period of execution of the sequence of instructions followed by an idle period, the idle period occurring before or during performance of the external operations.

19. The media of claim 14, wherein the activity data is stored in one or more data stores associated with a server computing machine.

20. The media of claim 14, wherein the activity data is received from the plurality of computing devices on a periodic basis.

* * * * *